Sept. 20, 1955   J. H. McFATRIDGE ET AL   2,718,182
COTTON CHOPPER
Filed June 24, 1952   2 Sheets-Sheet 1
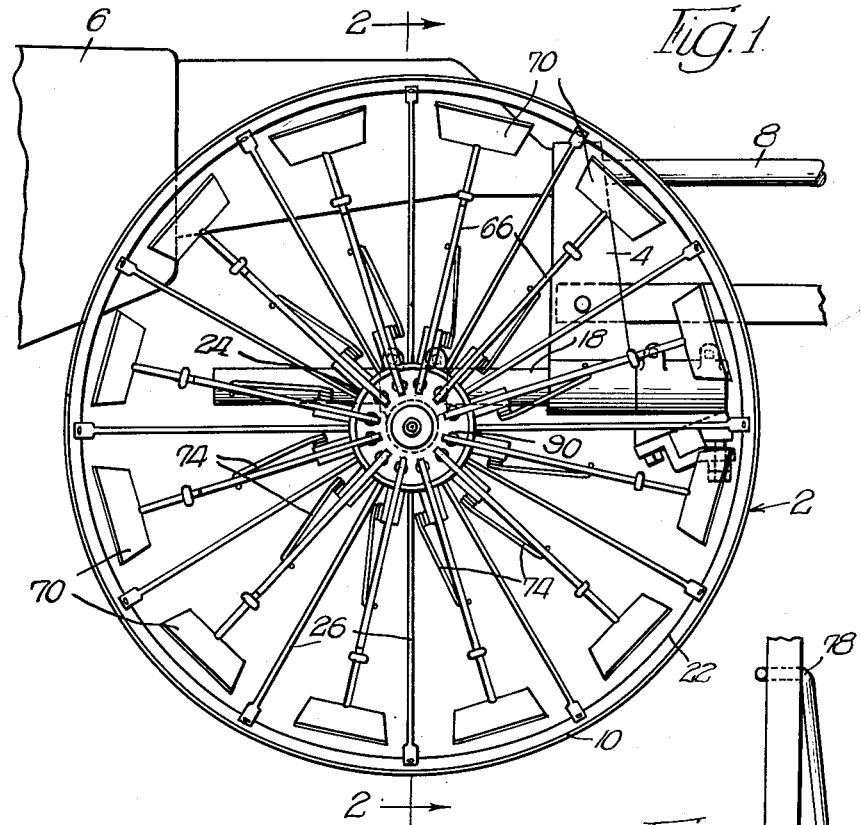
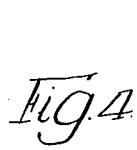
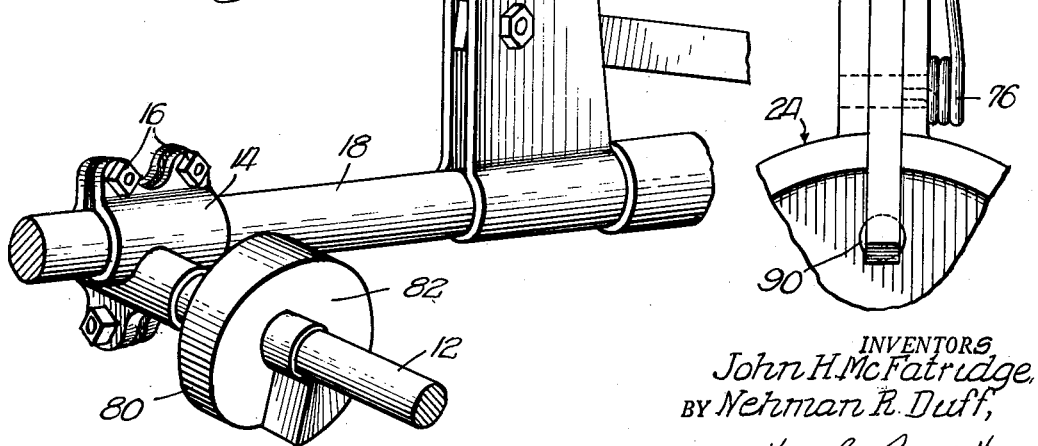
INVENTORS
John H. McFatridge,
BY Nehman R. Duff,
Wilkinson Huxley Byron & Hume
attys Sept. 20, 1955  J. H. McFATRIDGE ET AL  2,718,182
COTTON CHOPPER
Filed June 24, 1952  2 Sheets-Sheet 2
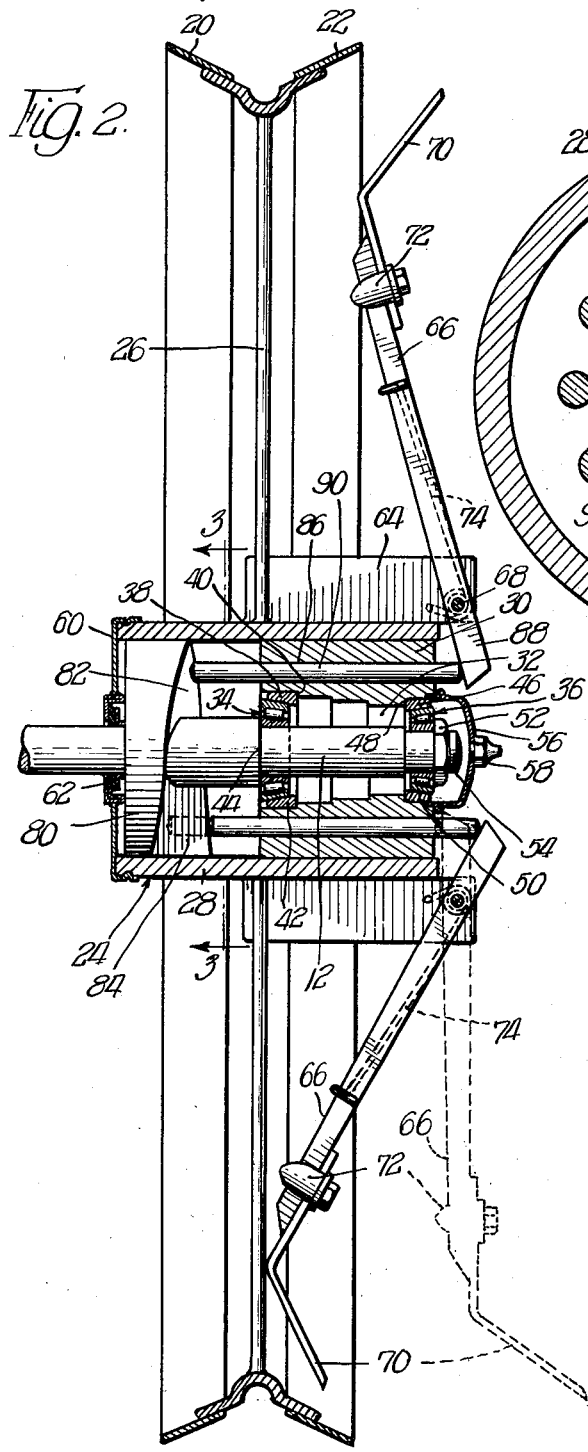
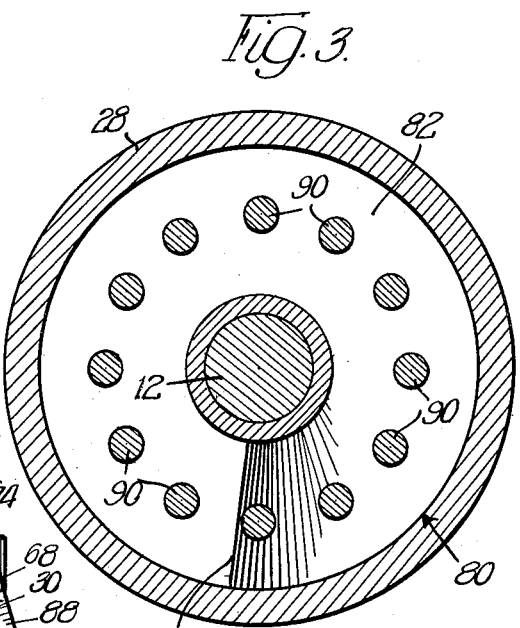
INVENTORS.
John H. McFatridge,
BY Nehman R. Duff,

United States Patent Office 2,718,182
Patented Sept. 20, 1955

2,718,182

COTTON CHOPPER

John H. McFatridge and Nehman R. Duff,
Pocahontas, Ark.

Application June 24, 1952, Serial No. 295,166

3 Claims. (Cl. 97—22)

The present invention relates to improvements in agricultural implements, and more particularly to plant thinning and cultivating devices for use in connection with corn, soybean, cotton plantings and the like.

Among the objects of the present invention is to provide a novel attachment for a farm tractor or other vehicle having a ground engaging wheel provided with a plurality of cutting elements and operating mechanism for causing said cutting elements to be successively moved outwardly of said wheel as the same advances over the ground for thinning out unwanted plants and weeds in planted rows thereby leaving hills spaced apart a desired distance and with a desired number of plants remaining in each hill.

A further desideratum of the present invention is to provide a novel implement as immediately hereinabove described which is of such construction that the same is light in weight, one which is easily and quickly mounted on and dismantled from a tractor or the like and which is readily and easily manufactured at a relatively low cost.

More particularly, the present invention contemplates an implement as hereinbefore described having a compactly arranged operating mechanism for the cutting elements which is completely enclosed within a housing formed as part of the hub assembly for the wheel, thus protecting the operating parts from dirt and dust and which is packed with a lubricant to assure proper operation thereof without excessive wear and deterioration.

Still another object of the present invention is to provide a device of the character hereinbefore set forth in which the enclosed operating mechanism for the cutting elements comprises a cam element for operation of a plurality of push rods which are operatively associated with a plurality of spring actuated arms for said cutting elements whereby said arms are successively and automatically operated in timed sequence to move outwardly for a cutting or chopping stroke.

Other objects, features, capabilities and advantages are comprehended by the invention, as will later appear and as are inherently possessed thereby.

Referring to the drawings:

Figure 1 is a side view in elevation of a thinning and cultivating device made in accordance with the present invention and showing its attachment to a tractor;

Figure 2 is a view in vertical cross section taken in the plane represented by the line 2—2 of Figure 1 of the drawings;

Figure 3 is a view in cross section taken in the plane represented by line 3—3 of Figure 2 of the drawings;

Figure 4 is a detached fragmentary view in perspective of a portion of the tractor frame and mounting means for the thinning and cultivating device; and Figure 5 is a fragmentary front view in elevation of one of the operating arms for the device disclosing more in particular the manner in whch the same is mounted.

Referring more in detail to the drawings, a plant thinning and cultivating device made in accordance with the present invention is disclosed as comprising a ground engaging wheel, generally referred to by reference numeral 2, mounted upon the frame 4 of a tractor 6. In the present illustrative assembly of the invention the device 2 is mounted upon the frame 4 which constitutes a portion of the cultivator mechanism for cultivating the soil between the rows of plants, such as soy beans, cotton, corn and the like. The frame 4 is movable with respect to the tractor 6 through linkage mechanism, generally referred to by the reference numeral 8, which may be manipulated by the operator of the tractor for moving the cultivator mechanism into and out of engagement with the soil between the rows and simultaneously moving the device 2 into and out of engaging relation with the soil.

The plant thinning and cultivating device 2 comprises a wheel assembly 10, rotatably mounted upon a shaft or spindle 12 rigidly secured, through the medium of clamping mechanism 14 and bolts 16 to a shaft 18 of the cultivator frame 4, whereby the wheel 10 is disposed on the side of the tractor and is rotated for thinning and cultivating the plants by engagement of the wheel with the ground. The wheel 10 is formed with a rim composed of two ground engaging elements 20 and 22 secured to a hub assembly 24 by means of a plurality of spokes 26 attached at their outer end in any suitable manner to the ground engaging rim portions 20 and 22 at their inner end to a cylindrical housing 28 forming a part of the hub assembly.

Press fitted within the outer end of the housing 28 is a hub element 30 having a central opening 32 adapted to receive the outer end of the shaft 12. The wheel 10 is rotatably mounted on the shaft 12 by means of inner and outer bearings 34 and 36, the former of which is provided with an outer race 38 having abutting relation with a shoulder 40 on the hub element 30 and an inner race 42 having abutting relation with a shoulder 44 provided on the shaft 12. The outer bearing 36 is provided with an outer race 46 having abutting engagement with a shoulder 48 of the hub element 30 and an inner race 50 adapted to be engaged by a nut 52 threaded upon the outer threaded end 54 of the shaft 12, which nut when tightened into engagement with the inner race of the outer bearing positions the wheel with respect to the shaft through the abutting engagement of the inner race 42 of the inner bearing with the shouldered portion 44 of the shaft 12.

The outer open end of the hub assembly is closed by a hub cap 56 press fitted into the open end of the hub element 30 and which is provided with a grease fitting 58 whereby lubricant may be introduced into the housing 24 to assure proper operation of the mechanism to be hereinafter more fully disclosed, which is located therein. The inner end of the housing element 28 is provided with a closure member 60 press fitted onto the housing element 28, the same being provided with a resilient sealing element 62 mounted therein which closely engages the shaft 12 to provide a grease seal therewith.

Secured to and extending radially outwardly from the housing element 28 is a plurality of brackets 64, twelve being shown in the present illustrative example of the invention, although it is to be understood that any desired number may be provided, said brackets 64 providing a mounting for a plurality of arms 66, the construction and operation of which are all alike, and reference will be made in detail to the construction and operation of one for purposes of illustration. Each arm 66 is pivotally mounted to a bracket 64, as at 68, intermediate its ends, the outer end of which has mounted thereon a cutter or hoe 70 secured thereto by the clamping bracket and bolt assembly 72. As more particularly shown in Figure 5 of the drawings, each arm has associated therewith a spring 74 having its inner coiled end section 76 secured in the bracket 64 and having its outer end provided with a hooked portion 78 embracing the arm 66 adjacent its outer end. This spring is under tension and normally operates to move the arm 66, together with the cutter 70, outwardly as will be hereinafter more fully explained.

In order to control the sequential operation of the arms 66, the shaft 12 has mounted thereon a cam element 80 disposed within the housing element 28 of the hub assembly adjacent its inner end and which cam element has a discontinuous cam surface 82 interrupted by a shoulder 84 extending axially between the ends of the cam surface 82. The hub element 30 is formed with axially extending openings 86 disposed in axial alignment with the inner ends 88 of each of the arms 66. Slidably mounted within each of these axially arranged openings is a push rod 90 having one end in engagement with the cam surface 82 and its other end in engagement with the inner end 88 of the arm 66.

As will be clearly apparent from the above description, when the wheel 10 is in engagement with the ground, the same will rotate with respect to the fixed shaft 12 and cam element 80 whereby the push rods 90 are moved over the cam surface 82 during which time the arms are maintained in inoperative position as shown in full lines in Figure 2 of the drawings. As the push rods 90 successively pass over the shoulder 84 from one terminal point to the other of the discontinuous cam surface 82, the push rod is moved axially outwardly under the action of the spring 74, which permits the springs to move the arms at a rapid operating speed to move the cutting element 70 outwardly with respect to the wheel, during which movement the cutting elements will thin out unwanted plants at spaced intervals leaving hills spaced apart a desired distance with a desired number of plants remaining in each hill. This thinning operation takes place at any desired interval, depending upon the number of cutting elements provided and the design of the cam element 80. It is understood, of course, that the wheel 10 is moved along the ground laterally of the rows of plants and that the stroke of the arms 66 is such that the cutters 70 are effective to remove the undesired plants within the row.

The shoulder 84 is so disposed that when the wheel is lifted from its ground engaging position the cutters will be so arranged that when the wheel is again lowered, the same are in position for a thinning and cultivating operation. The cam is so constructed that after a cutting or chopping operation, the particular arm 66 which is moved outwardly during the cutting operation is retracted so as not to interfere with the plants which remain in the hills forming the rows being thinned and cultivated.

The present device has certain inherent desirable characteristics with respect to the particular hub construction and the operating mechanism disposed therein for effecting the chopping operation. Such desirable features reside in the fact that the entire operating mechanism is enclosed within a sealed housing which may be effectively lubricated and protected from dust and dirt which would otherwise cause rapid deterioration of such operating parts. These parts may be maintained in sealed and lubricated condition by virtue of the present construction and the device accordingly has considerable merit in the respects indicated, particularly because of its operation over plowed ground where dirt and dust is created during a thinning and cultivating operation.

While we have herein described and upon the drawings shown an illustrative embodiment of the invention, it is to be understood that the invention is not limited thereto, but may comprehend other constructions, arrangements of parts, details and features without departing from the spirit of the invention.

What is claimed is:

1. A plant thinning and cultivating device comprising a shaft adapted to be mounted on a vehicle, a ground engaging wheel having a hub rotatably mounted on said shaft, a cam element mounted on said shaft and disposed within said hub, said cam element having a discontinuous cam surface provided on one face thereof interrupted by an axially arranged shoulder, a plurality of push rods mounted in said hub, said push rods having one end in engagement with said cam surface and the other end extending outwardly beyond said hub, a plurality of spring operated arms pivotally mounted on said hub, each of said arms having their inner end engaging one of said push rods, each of said arms extending radially outward from said hub and having a cutting element mounted on the outer end thereof, the push rods and cams being so related to the arms that when the arms are swung to retracted position, the cutting elements on the arms are retracted within the contour of the ground engaging wheel prior to reaching the point where the adjacent portion of the wheel engages the ground, said arms being successively moved outwardly of said wheel under the action of its associated spring when the push rod for operating the same moves over said shoulder during rotation of said wheel, said cam shoulder being located to release the arms for outward movement of the cutting elements when the radially adjacent portion of the wheel is approximately in position in contact with the ground.

2. A plant thinning and cultivating device comprising a shaft adapted to be mounted on a vehicle, a ground engaging wheel having a hub, said hub comprising an outer housing member and a hub element mounted therein for rotatably mounting said wheel on said shaft, a cam element mounted on said shaft and disposed within said housing member, said cam element having a discontinuous cam surface provided on one face thereof interrupted by an axially arranged shoulder, a plurality of push rods slidably mounted in said hub element, said push rods having one end in engagement with said cam surface and the other end extending outwardly beyond said hub element, a closure member for the inner end of said housing member and for the outer end of said hub element whereby a lubricant is retained within said hub, a plurality of spring operated arms pivotally mounted on said hub, each of said arms having their inner end engaging one of said push rods, each of said arms extending radially outward from said hub and having a cutting element mounted on the outer end thereof, the push rods and cams being so related to the arms that when the arms are swung to retracted position, the cutting elements on the arms are retracted within the contour of the ground engaging wheel prior to reaching the point where the adjacent portion of the wheel engages the ground, said arms being successively moved outwardly of said wheel under the action of its associated spring when the push rod for operating the same moves over said shoulder during rotation of said wheel, said cam shoulder being located to release the arms for outward movement of the cutting elements when the radially adjacent portion of the wheel is approximately in position in contact with the ground.

3. A plant thinning and cultivating device comprising a shaft adapted to be mounted on a vehicle, a ground engaging wheel having a hub, said hub comprising an outer housing member having a closure for its inner end and a hub element mounted in said housing member for rotatably mounting said wheel on said shaft, a closure for said hub element whereby a lubricant is retained within said housing, a cam element mounted on said shaft and disposed within said housing member, said cam element having a discontinuous cam surface provided on one face thereof interrupted by an axially arranged shoulder, said shoulder being located at a point on said cam directed toward the ground, a plurality of push rods slidably mounted in said hub element, said push rods having one end in engagement with said cam surface and the other end extending outwardly beyond said hub element, a plurality of radially extending brackets secured to said housing member adjacent its outer end, a plurality of spring operated arms pivoted to said brackets, each of said arms having their inner end engaging one of said push rods, each of said arms extending radially outward from said hub and having a cutting element mounted on the outer end thereof, said arms being moved within the contour of the wheel by the push rods when the push rods are on the high side of the cam shoulder, each arm being successively moved outwardly of said wheel under the action of its associated spring when the push rod for operating the same moves over said shoulder during rotation of said wheel.

References Cited in the file of this patent

UNITED STATES PATENTS

| | | |
|---|---|---|
| 697,028 | Shields | Apr. 8, 1902 |
| 764,554 | Brown | July 12, 1904 |
| 811,106 | Sutton | Jan. 30, 1906 |
| 1,211,971 | Siemann | Jan. 9, 1917 |
| 2,120,915 | Young | June 14, 1938 |
| 2,256,220 | Sjogren | Sept. 16, 1941 |
| 2,517,288 | Dabbs et al. | Aug. 1, 1950 |
| 2,574,666 | Seltzer | Nov. 13, 1951 |